United States Patent
Ording

(10) Patent No.: US 9,213,714 B1
(45) Date of Patent: Dec. 15, 2015

(54) INDICATING HIERARCHY IN A COMPUTER SYSTEM WITH A GRAPHICAL USER INTERFACE

(75) Inventor: Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1925 days.

(21) Appl. No.: 10/875,077

(22) Filed: Jun. 22, 2004

(51) Int. Cl.
    *G06F 17/30* (2006.01)
    *G06F 3/0481* (2013.01)
    *G06F 3/0482* (2013.01)

(52) U.S. Cl.
    CPC ........ *G06F 17/30126* (2013.01); *G06F 3/0481* (2013.01); *G06F 3/0482* (2013.01); *G06F 17/30112* (2013.01)

(58) Field of Classification Search
    CPC . G06F 3/0481; G06F 3/04817; G06F 3/0482; G06F 9/4443; G06F 3/0483; G06F 17/30126; G06F 17/30112; G06F 17/30091
    USPC .................. 715/853, 803, 528, 854, 907, 713
    See application file for complete search history.

(56) References Cited

U.S. PATENT DOCUMENTS

| | | | | |
|---|---|---|---|---|
| 4,570,182 A | * | 2/1986 | Johnson et al. | 348/578 |
| 4,698,625 A | * | 10/1987 | McCaskill et al. | 345/157 |
| 5,103,407 A | * | 4/1992 | Gabor | 345/601 |
| 5,142,615 A | * | 8/1992 | Levesque et al. | 345/595 |
| 5,249,263 A | * | 9/1993 | Yanker | 345/594 |
| 5,305,435 A | * | 4/1994 | Bronson | 715/777 |
| 5,357,603 A | * | 10/1994 | Parker | 715/765 |
| 5,371,553 A | * | 12/1994 | Kawamura et al. | 725/59 |
| 5,371,844 A | | 12/1994 | Andrew et al. | |
| 5,459,831 A | | 10/1995 | Brewer et al. | |
| 5,485,175 A | * | 1/1996 | Suzuki | 715/841 |
| 5,559,945 A | * | 9/1996 | Beaudet et al. | 715/841 |
| 5,565,888 A | * | 10/1996 | Selker | 715/823 |
| 5,586,255 A | * | 12/1996 | Tanaka et al. | 709/223 |
| 5,611,037 A | * | 3/1997 | Hayashi | 345/442 |
| 5,659,475 A | * | 8/1997 | Brown | 701/120 |
| 5,659,693 A | * | 8/1997 | Hansen et al. | 715/779 |
| 5,680,558 A | * | 10/1997 | Hatanaka et al. | 715/838 |
| 5,687,331 A | * | 11/1997 | Volk et al. | 715/840 |
| 5,689,286 A | * | 11/1997 | Wugofski | 715/835 |
| 5,704,051 A | * | 12/1997 | Lane et al. | 715/855 |

(Continued)

FOREIGN PATENT DOCUMENTS

JP         02301821 A   *   12/1990          G06F 3/14

OTHER PUBLICATIONS

"Dynamically generating color families and assigning colors to differentiate multi-level hierarchical groups;" IBM technical Disclosure Bulletin, Jul. 2001, UK; Issue No. 447; p. No. 1240; TDB-ACC-No. NNRD447147.*

(Continued)

*Primary Examiner* — Eric Wiener
(74) *Attorney, Agent, or Firm* — Schwegman Lundberg & Woessner, P.A.

(57) ABSTRACT

Some embodiments of the invention provide a method for indicating hierarchy of objects in a graphical user interface (GUI) of a computer system. The method uses a first color to display a first set of objects at a first level of the hierarchy. The method then uses a second color, different from the first color, to display a second set of objects at a second level of the hierarchy. The first and second colors are two different colors in the visible light spectrum in some embodiments, while they are two different shades of the same color in other embodiments.

9 Claims, 13 Drawing Sheets

(56) References Cited

U.S. PATENT DOCUMENTS

| | | | |
|---|---|---|---|
| 5,736,974 A * | 4/1998 | Selker | 715/862 |
| 5,737,558 A * | 4/1998 | Knight et al. | 715/788 |
| 5,751,287 A | 5/1998 | Hahn et al. | |
| 5,754,178 A * | 5/1998 | Johnston et al. | 715/769 |
| 5,774,119 A * | 6/1998 | Alimpich et al. | 715/764 |
| 5,797,139 A | 8/1998 | Amro | |
| 5,805,165 A * | 9/1998 | Thorne et al. | 715/823 |
| 5,835,919 A | 11/1998 | Stern et al. | |
| 5,844,559 A * | 12/1998 | Guha | 715/846 |
| 5,917,492 A * | 6/1999 | Bereiter et al. | 715/854 |
| 5,920,313 A * | 7/1999 | Diedrichsen et al. | 715/767 |
| 5,937,419 A * | 8/1999 | Oshiro et al. | 715/209 |
| 5,940,078 A * | 8/1999 | Nagarajayya et al. | 715/859 |
| 5,959,624 A | 9/1999 | Johnston et al. | |
| 5,963,206 A | 10/1999 | Ulrich et al. | |
| 5,987,469 A * | 11/1999 | Lewis et al. | 707/102 |
| 6,100,873 A | 8/2000 | Bayless et al. | |
| 6,104,391 A * | 8/2000 | Johnston et al. | 715/745 |
| 6,175,364 B1 * | 1/2001 | Wong et al. | 715/763 |
| 6,188,399 B1 | 2/2001 | Voas et al. | |
| 6,215,490 B1 * | 4/2001 | Kaply | 715/788 |
| 6,229,536 B1 * | 5/2001 | Alexander et al. | 345/440.1 |
| 6,236,400 B1 * | 5/2001 | Guerrero | 715/841 |
| 6,239,795 B1 | 5/2001 | Ulrich et al. | |
| 6,252,597 B1 * | 6/2001 | Lokuge | 715/841 |
| 6,281,896 B1 * | 8/2001 | Alimpich et al. | 715/781 |
| 6,326,962 B1 * | 12/2001 | Szabo | 715/762 |
| 6,337,699 B1 * | 1/2002 | Nielsen | 715/837 |
| 6,421,072 B1 * | 7/2002 | Ku et al. | 715/804 |
| 6,456,296 B1 * | 9/2002 | Cataudella et al. | 345/619 |
| 6,466,228 B1 | 10/2002 | Ulrich et al. | |
| 6,469,660 B1 * | 10/2002 | Horvath et al. | 342/179 |
| 6,476,834 B1 * | 11/2002 | Doval et al. | 715/863 |
| 6,496,208 B1 * | 12/2002 | Bernhardt et al. | 715/853 |
| 6,501,490 B1 * | 12/2002 | Bell | 715/837 |
| 6,518,985 B2 * | 2/2003 | Ozcelik et al. | 715/794 |
| 6,549,218 B1 * | 4/2003 | Gershony et al. | 715/781 |
| 6,549,219 B2 * | 4/2003 | Selker | 715/834 |
| 6,628,313 B1 * | 9/2003 | Minakuchi et al. | 715/853 |
| 6,643,824 B1 * | 11/2003 | Bates et al. | 715/205 |
| 6,690,382 B1 * | 2/2004 | Tanigawa et al. | 345/593 |
| 6,741,268 B1 * | 5/2004 | Hayakawa | 715/777 |
| 6,750,879 B2 | 6/2004 | Sandberg | |
| 6,754,906 B1 * | 6/2004 | Finseth et al. | 725/45 |
| 6,765,597 B2 * | 7/2004 | Barksdale et al. | 715/853 |
| 6,826,729 B1 * | 11/2004 | Giesen et al. | 715/837 |
| 6,873,337 B1 * | 3/2005 | Fernandez et al. | 345/581 |
| 6,917,373 B2 * | 7/2005 | Vong et al. | 715/840 |
| 6,928,625 B2 * | 8/2005 | Makinen | 715/822 |
| 6,948,134 B2 * | 9/2005 | Gauthier et al. | 715/804 |
| 6,958,758 B2 | 10/2005 | Ulrich et al. | |
| 6,975,330 B1 * | 12/2005 | Charlton et al. | 345/593 |
| 6,976,212 B2 * | 12/2005 | Newman et al. | 715/227 |
| 6,990,638 B2 * | 1/2006 | Barksdale et al. | 715/853 |
| 7,017,122 B1 * | 3/2006 | Lee et al. | 715/812 |
| 7,036,092 B2 * | 4/2006 | Sloo et al. | 715/841 |
| 7,075,550 B2 * | 7/2006 | Bonadio | 345/589 |
| 7,086,011 B2 * | 8/2006 | Budrys et al. | 715/837 |
| 7,107,545 B2 * | 9/2006 | Adleman | 715/767 |
| 7,120,646 B2 * | 10/2006 | Streepy, Jr. | 707/104.1 |
| 7,194,699 B2 * | 3/2007 | Thomson et al. | 715/823 |
| 7,216,303 B2 * | 5/2007 | Aggarwal et al. | 715/825 |
| 7,322,007 B2 | 1/2008 | Schowtka et al. | |
| 7,336,279 B1 * | 2/2008 | Takiguchi | 345/473 |
| 7,337,412 B2 * | 2/2008 | Guido et al. | 715/853 |
| 7,363,593 B1 * | 4/2008 | Loyens et al. | 715/853 |
| 7,418,670 B2 * | 8/2008 | Goldsmith | 715/810 |
| 7,573,487 B1 * | 8/2009 | Petersen | 345/629 |
| 7,574,669 B1 * | 8/2009 | Braun et al. | 715/777 |
| 7,716,601 B2 * | 5/2010 | Yoshida | 715/821 |
| 7,719,542 B1 * | 5/2010 | Gough et al. | 345/581 |
| 7,752,572 B1 * | 7/2010 | Shahrbabaki et al. | 715/817 |
| 2001/0020956 A1 * | 9/2001 | Moir | 345/765 |
| 2002/0171624 A1 * | 11/2002 | Stecyk et al. | 345/156 |
| 2003/0063797 A1 * | 4/2003 | Mao | 382/162 |
| 2003/0156119 A1 * | 8/2003 | Bonadio | 345/589 |
| 2003/0214539 A1 * | 11/2003 | Iwema et al. | 345/861 |
| 2004/0046776 A1 * | 3/2004 | Phillips et al. | 345/700 |
| 2004/0216156 A1 * | 10/2004 | Wagner | 725/39 |
| 2005/0039142 A1 * | 2/2005 | Jalon et al. | 715/823 |
| 2005/0149853 A1 * | 7/2005 | Naitou | 715/501.1 |
| 2005/0188332 A1 * | 8/2005 | Kolman | 715/822 |
| 2005/0193344 A1 * | 9/2005 | Miyaji | 715/722 |
| 2005/0253865 A1 * | 11/2005 | Proteau et al. | 345/592 |

OTHER PUBLICATIONS

U.S. Appl. No. 10/875,076, filed Jun. 22, 2004, Imran Chaudhri.
Non-Final Office Action of U.S. Appl. No. 10/875,076, May 21, 2007 (mailing date), Imran Chaudhri.
Final Office Action of U.S. Appl. No. 10/875,076, Feb. 13, 2008 (mailing date), Imran Chaudhri.
Advisory Action of U.S. Appl. No. 10/875,076, May 22, 2008 (mailing date), Imran Chaudhri.
Non-Final Office Action of U.S. Appl. No. 10/875,076, Sep. 9, 2008 (mailing date), Imran Chaudhri.

* cited by examiner

INDICATING HIERARCHY IN A COMPUTER SYSTEM WITH A GRAPHICAL USER INTERFACE

FIELD OF THE INVENTION

The present invention relates to indicating hierarchy in a computer system with a graphical user interface.

BACKGROUND OF THE INVENTION

Today's operating systems and applications come packaged with numerous functions and features. Most operating systems and applications use a graphical user interface ("GUI") in some shape or form, as a GUI simplifies a user's interaction with the computer.

Organization and presentation are the key elements in designing a successful GUI because users depend on the visual presentation of the GUI to guide them through the process. This is especially true today because computer screens are cluttered with numerous windows and icons. Given that the computer screen can display many active windows, it may be hard for users to navigate through all the options that are presented to them.

Therefore, there is a need for a method that organizes features that are embedded within other features. Specifically, there is a need for a method for creating hierarchical structures. Moreover, there is a need for a method that organizes embedded levels in such a way that users can easily see the embedded levels. More generally, there is a need for a method that visually illustrates different types of hierarchy between items (e.g., objects, windows, etc.) in a GUI.

SUMMARY OF THE INVENTION

Some embodiments of the invention provide a method for indicating hierarchy of objects in a graphical user interface (GUI) of a computer system. The method uses a first color to display a first set of objects at a first level of the hierarchy. The method then uses a second color, different from the first color, to display a second set of objects at a second level of the hierarchy. The first and second colors are two different colors in the visible light spectrum in some embodiments, while they are two different shades of the same color in other embodiments.

DETAILED DESCRIPTION OF THE INVENTION

Figure 1:
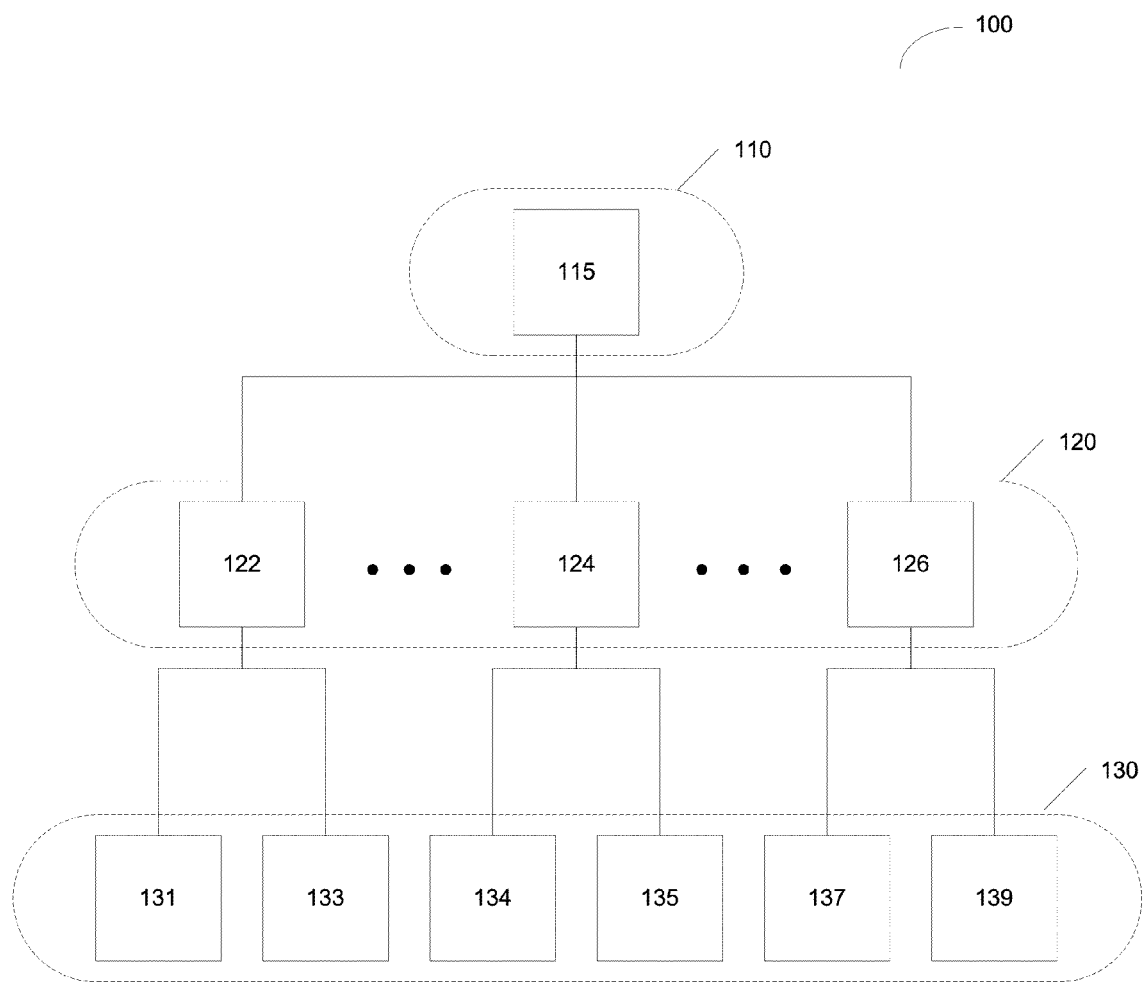
FIG. 1 illustrates an example of a hierarchical structure.

In the following detailed description of the invention, numerous details, examples and embodiments of the invention are set forth and described. However, it will be clear and apparent to one skilled in the art that the invention is not limited to the embodiments set forth and that the invention may be practiced without some of the specific details and examples discussed.

I. DEFINITIONS

As used in this document, the term "color" includes all colors in the light spectrum. As used in this application, two colors are different colors when they are two different colors in the spectrum of visible light, or are two different shades of the same color.

A graphical user interface ("GUI") is an interface of a computer system that allows users to interact with the computer system through images and text. A GUI allows users of the computer system to interact with the computer system in an intuitive graphical manner. Instead of learning and writing complex command languages, users can perform many operations by simply interacting with the visual components of a GUI, which are often easy to understand. A GUI often includes a cursor pointer, icons, desktop, windows, etc. The desktop refers to the contents on a display screen below any windows. A window is an area on the display screen that displays its own file, message, application, etc. independently of other windows that are displayed on the display screen.

The cursor pointer (the "cursor") is a pointer that a user can move across the GUI through the operation of a cursor controller, such as a mouse, a trackpad, trackball, etc. A user can use the cursor to select objects in the GUI. For instance, the user can select an object by dragging the cursor to the object and perform a click operation (e.g., through a button of the cursor controller). Generally, an object is an item that can be selected or manipulated. This can include any shape or figure that appears on a display screen of a computer system. Icons are examples of selectable objects in a GUI. Icons are used to represent folders, files, commands, etc. in the GUI. An icon can be represented by a text component, an image component, or both text and image components.

Sometimes objects are organized into object groups. An object group is a number of individual objects that have one or more unifying characteristics, attributes or relationships. Therefore, an object group is a number of objects that are associated with one another so as to exhibit one or more unifying attributes.

A group of objects are often organized in a structure. For instance, one structure would arrange a set of objects according to a particular relationship between each object. This type of structure is a hierarchical structure. A hierarchy is a classification of objects that reflects the relative position of each object in the hierarchy. As such, in a hierarchical structure, objects are organized in a manner that classifies the objects by their standing or ranking within the structure and relative to each other. Their standing within the hierarchy structure can be based on any part of an object's attributes. For example, a hierarchical structure can be based on an object's ability, importance, dependence, or any combination thereof.

In some instances, a hierarchical structure may be in the form of a parent-child relationship structure. FIG. 1 illustrates an example of what a hierarchical structure might look like in a parent-child relationship. FIG. 1 illustrates a hierarchical structure 100 with a parent level 110, which includes a parent object 115. The parent object 110 sits on top of the hierarchical structure 100, which indicates that it has the highest standing or ranking within this structure. Below the parent object 110 is a child level 120. The child level 120 includes N child objects 122, 124, and 126. In this structure, all the objects within the child level 120 are subordinate to the objects in the parent level 110. That is, they have standing or ranking that is lower to the parent level 110, as well as to the parent object 115. However, the child objects (e.g., objects 122, 124, and 126) have the same standing within this structure. In general, a parent object is any object having a subordinate/child object. Similarly, a child object is any object that has a parent/super-ordinate object.

Furthermore, all the objects in the child level 120 are subordinate to parent object 115 because they are below parent level 110. This subordination can be manifested in the GUI in a variety of ways. For instance, one way to manifest this subordination in the GUI is to show the child objects (in this case, the objects at the child level 120) each time a parent object (in this case, an object at the parent level 110) is selected. As further described below, a "tab group" is one such manifestation. Specifically, the GUI might include one window that is designed to show one set of selectable parent objects and their respective child objects in a "tab group". In such a group, the parent objects are illustrated as tab icons within the window. Each time one of the parent objects is selected, these embodiments display the child objects of the selected parent object in a display section of the window.

Each selectable child object can have its own child objects. For instance, FIG. 1 illustrates a grandchild level 130 below the child level 120. The grandchild level 130 has M grandchild objects 131, 133, 134, 135, 137, and 139, which are child objects of the objects at the child level 120. In this structure, grandchild level 130 is below child level 120 and thus all the objects in grandchild level 130 are subordinate (lower standing or ranking) to the objects in child level 120. As mentioned above, one way to manifest this subordination in the GUI is to show the child objects (in this case, the objects at the grandchild level 130) each time a parent object (in this case, an object at the child level 120) is selected.

In FIG. 1, each child object has two grandchild objects. In other structures, each child object may have more or less grandchild objects. Furthermore, in FIG. 1, the hierarchical structure 100 has three hierarchical levels (i.e., parent, child, and grandchild). However, other hierarchical structures include many more levels.

II. OVERVIEW

Some embodiments of the invention provide a method for indicating hierarchy of objects in a graphical user interface (GUI) of a computer system. The method uses a first color to display a first set of objects at a first level of the hierarchy. The method then uses a second color, different from the first color, to display a second set of objects at a second level of the hierarchy. The first and second colors are two different colors in the visible light spectrum in some embodiments, while they are two different shades of the same color in other embodiments.

In some embodiments, the first set of objects includes a parent object, while the second set of objects include child objects of the parent object that are presented in the GUI when the parent object is selected. In some cases, the parent object and the child objects are presented in the same window. In some of these cases, the second color is used as a color of a first section in the window that is used to display the child objects, while the first color is used as a color to show a second section in the window that does not include the first section. The parent object can be displayed in the second section, or it can be displayed between the first and second sections. In some of these embodiments, the first set of objects includes several parent objects that are arranged in a tab group.

In some embodiments, the parent object is displayed in a first window and the child objects are displayed in a second window. In these embodiments, the method uses the first color to display the first window and uses the second color to display the second window. Alternatively, in some embodiments, the GUI objects are windows organized in a stack, and the hierarchy between these objects is a stacking order of the windows in the stack. In some of these embodiments, the method uses the first color to display the location of a first window in the stack, and uses the second color to display the location of a second window in the stack.

III. HIERCHICAL STRUCTURES WITHIN THE SAME WINDOW

A. Examples

There are many types of hierarchical structures that can be generated in a graphical user interface. A tab panel that includes several tabs is a possible way of organizing objects in a hierarchical structure. In a tab panel, objects are organized and identified by tabs, much like how they would be organized in a file cabinet. In the graphical user interface, each tab is a selectable parent object, and all the tabs in the tab group are presented in series so that they are easy to view. To make tab groups accessible, all the tabs are always shown, regardless of which tab a users has selected at any given time. When one of the tabs is selected, its child objects are presented in a display section of the window containing the tab group.

Figure 2:
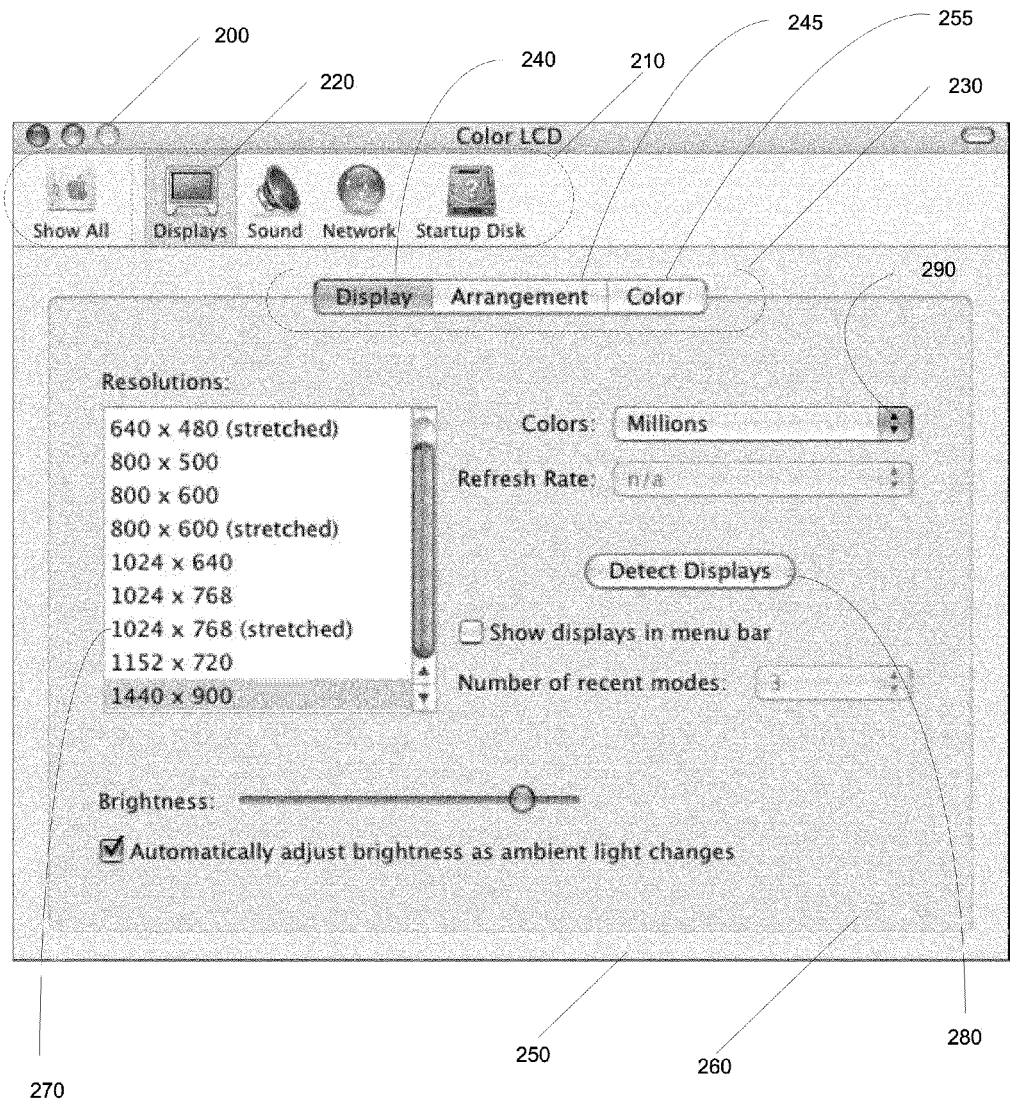
FIG. 2 illustrates a GUI tab panel with display tab group selected.

FIG. 2 illustrates a window 200 in a GUI that implements the invention for a tab group. Window 200 presents an illustration of a parent icon group 210 comprised of Displays icon 220. Furthermore, window 200 presents a child icon group 230 of the Displays icon 220. The child icon group 230 includes a Display icon 240, an Arrangement icon 245, and a Color icon 255.

The window 200 also includes a background section 250 and a viewing section 260. The background section 250 is an area of the window 200 for displaying objects that have a subordinate relationship to parent icon group 210. The display section 260 is an area within the background section 250 for displaying objects that have a subordinate relationship to the child icon group 230.

FIG. 2 illustrates the window 200 after the Displays icon 220 has been selected. In this figure, the Displays icon 220 is highlighted in a color to indicate that the Displays icon 220 has been selected. The color of the background of the Displays icon 220 is identical or similar to the color of the background section 250 in some embodiments, while it is a different color in other embodiments.

The background section 250 is an area of window 200 for displaying objects that have a hierarchical relationship to the parent icon group 210. In this instance, background section 250 is displaying icons that have a hierarchical relationship to Displays icon 220. More specifically, the background section 250 is displaying objects that are subordinate to Displays icon 220, such as the child icon group 230.

As mentioned above, Display icon 240 in the child icon group 230 is selected. As a result, the child viewing section 260 displays objects that have a subordinate relationship to the Display icon 240. In this illustration, these objects include a viewing area 270 that lists several different selectable screen resolutions. Other examples of child objects of the Display icon 240 include a pull down menu 290 for selecting types of colors and a Detect Display icon 280 for automatically detecting the computer's display. To indicate that the child objects of the Display icon 240 are subordinate to the Display icon 240, the child viewing section 260 has a darker shade of color than the color of the background section 250.

Figure 3:
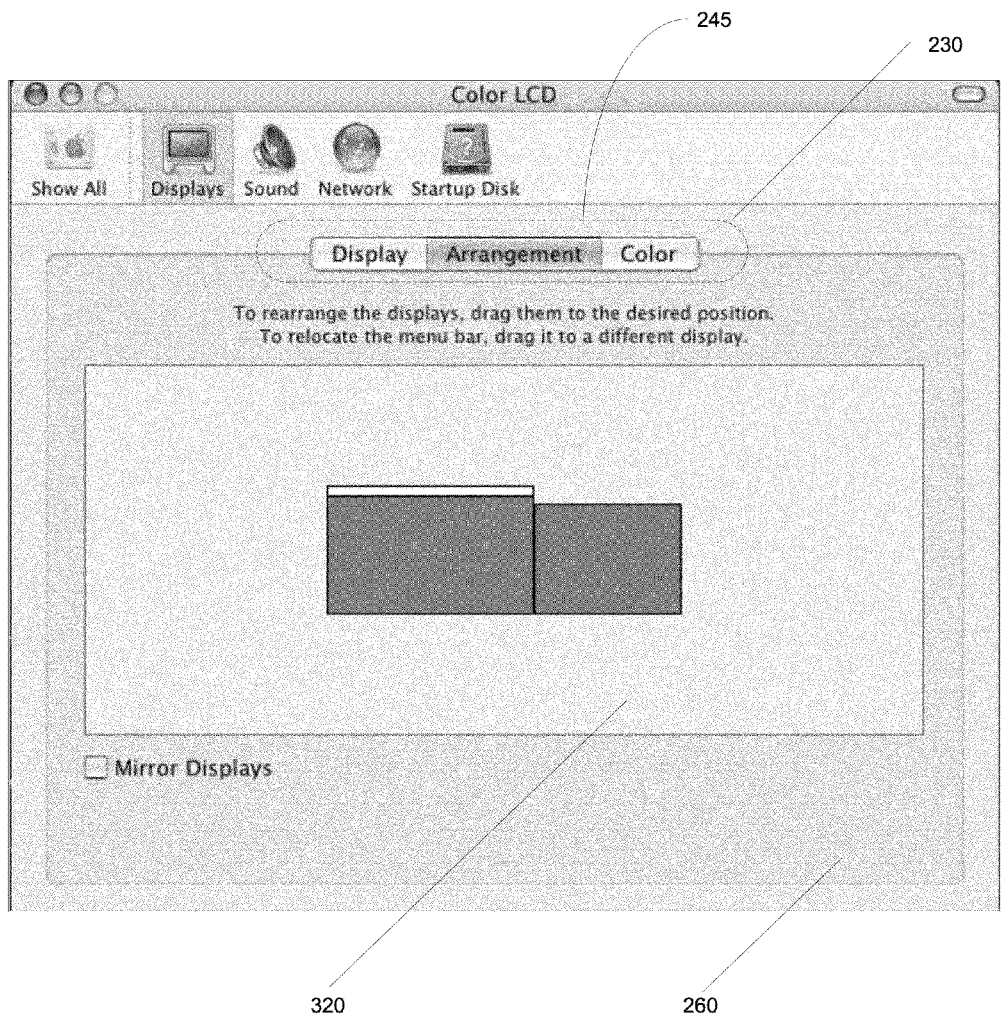
FIG. 3 illustrates a GUI tab panel with arrangement tab group selected.

FIG. 3 illustrates the window 200 after the Arrangement icon 245 in the child icon group 230 has been selected. In this figure, the Arrangement icon 245 is highlighted with a colored background to indicate that it is selected. Accordingly, the child viewing section 260 displays child objects of the Arrangement icon 245. Furthermore, the color of the child viewing section 260 is again a darker shade of the color than the color of the background 250, to indicate once again the subordinate relationship between the objects illustrated in the viewing section 260 and the Arrangement icon 245.

Within child viewing section 260, there are various objects that are subordinate to arrangement icon 245. These objects include (1) a viewing area 320 for displaying figures and diagrams associated with Arrangement icon 245, and (2) text to describe the objects within the child viewing section 260.

Figure 4:
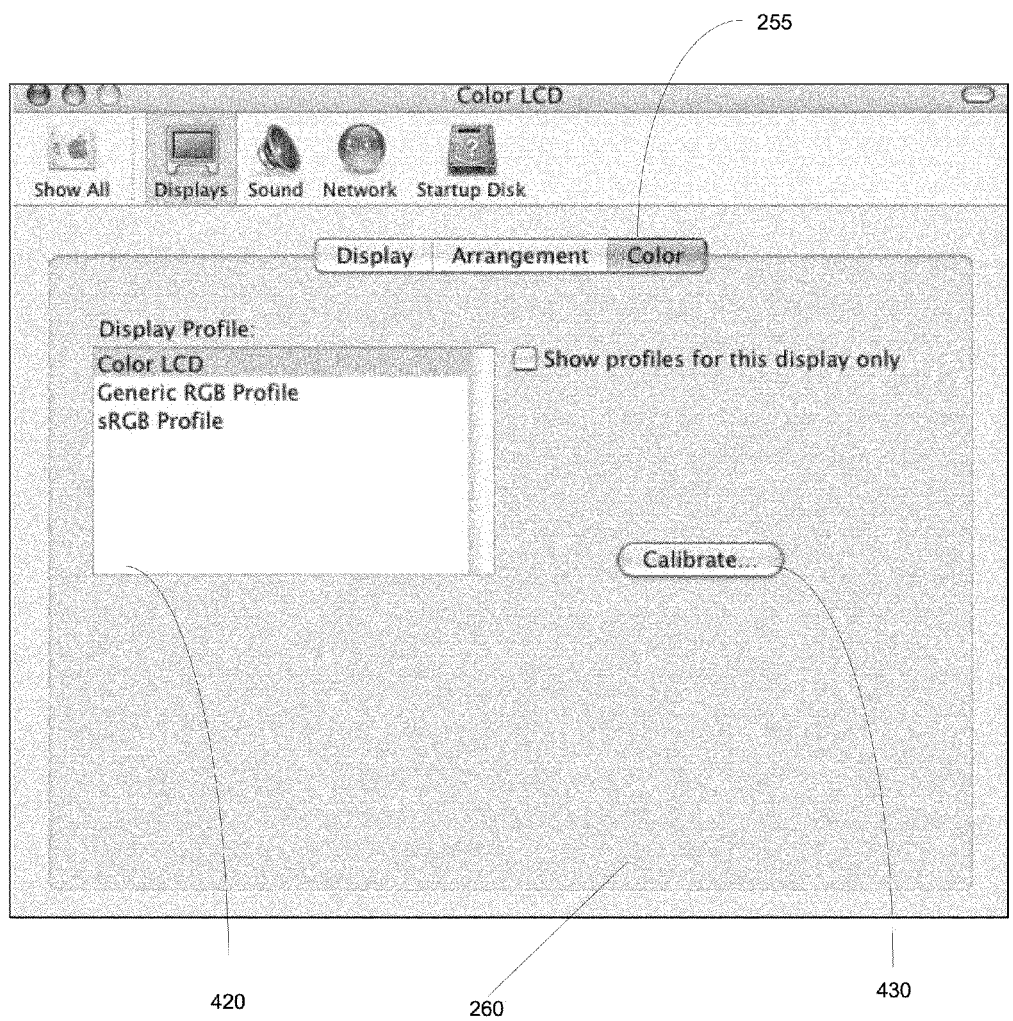
FIG. 4 illustrates a GUI tab panel with color tab group selected.

FIG. 4 illustrates the window 200 after the Color icon 255 in the child icon group 230 has been selected. In this figure, the Color icon 255 is highlighted with a colored background to indicate that it is selected. Accordingly, the child viewing section 260 displays child objects of the Color icon 245. Furthermore, the color of the child viewing section 260 is again a darker shade of the color than the color of the background 250, to indicate once again the subordinate relationship between the objects illustrated in the viewing section 260 and the Color icon 255. The objects within the child viewing section 260 that are subordinate to Color icon 255 include (1) a list 420 for presenting various display profiles, and (2) a calibrate icon 430 for calibrating the display.

B. Process

Figure 5:
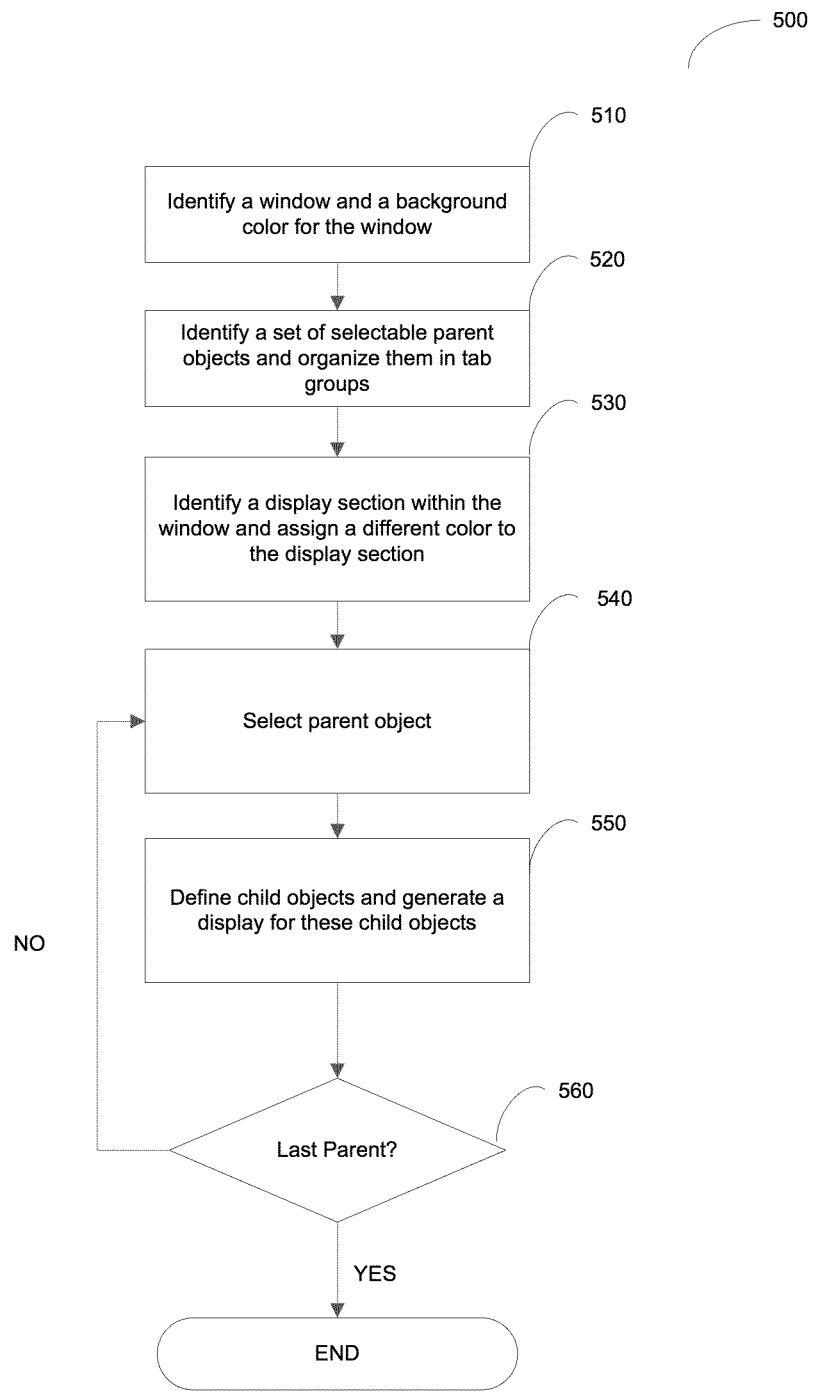
FIG. 5 illustrates a process diagram that a GUI may perform to create a hierarchical structure.
Figure 7:
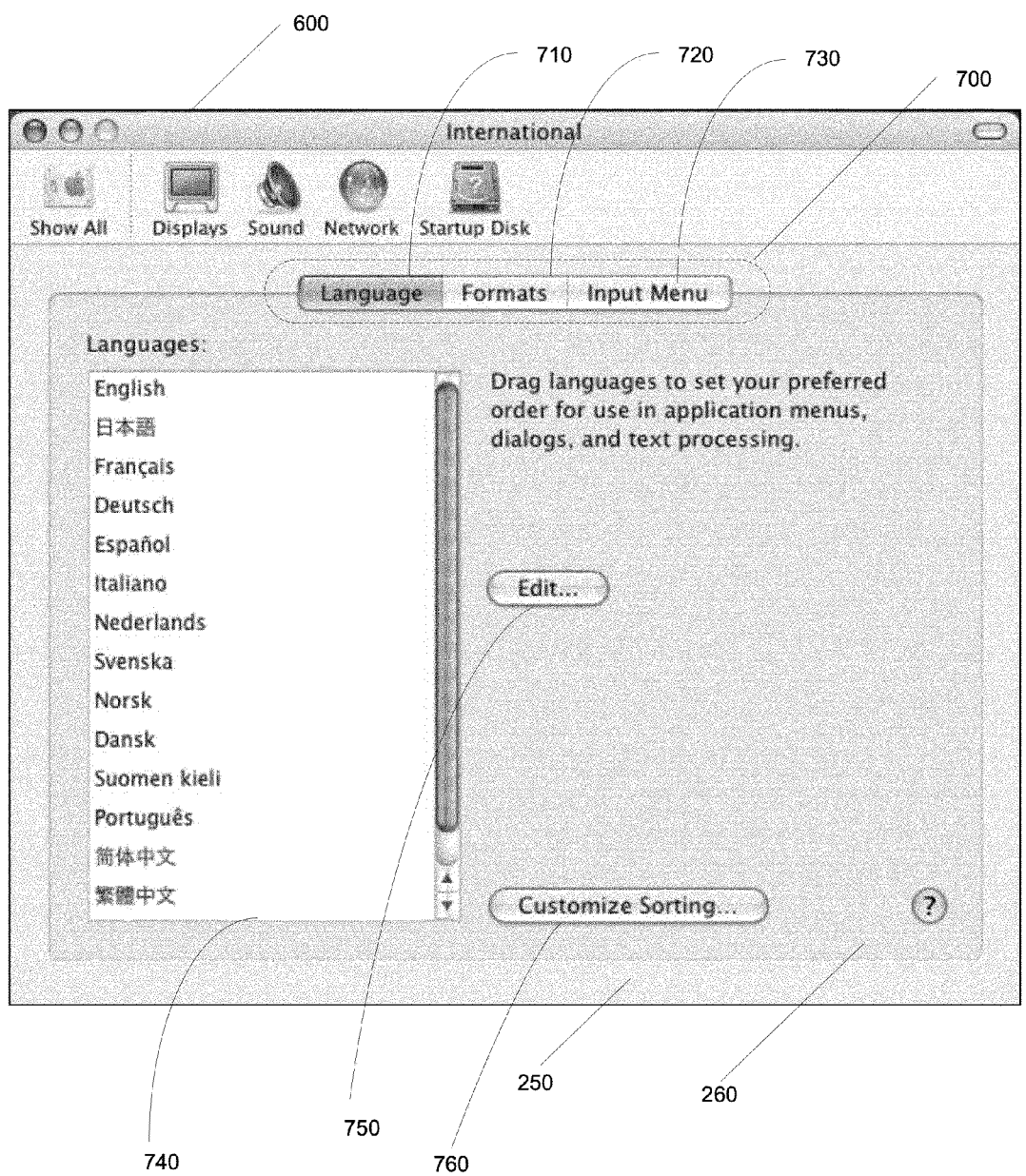
FIG. 7 illustrates a GUI tab panel with language tab group selected.
Figure 8:
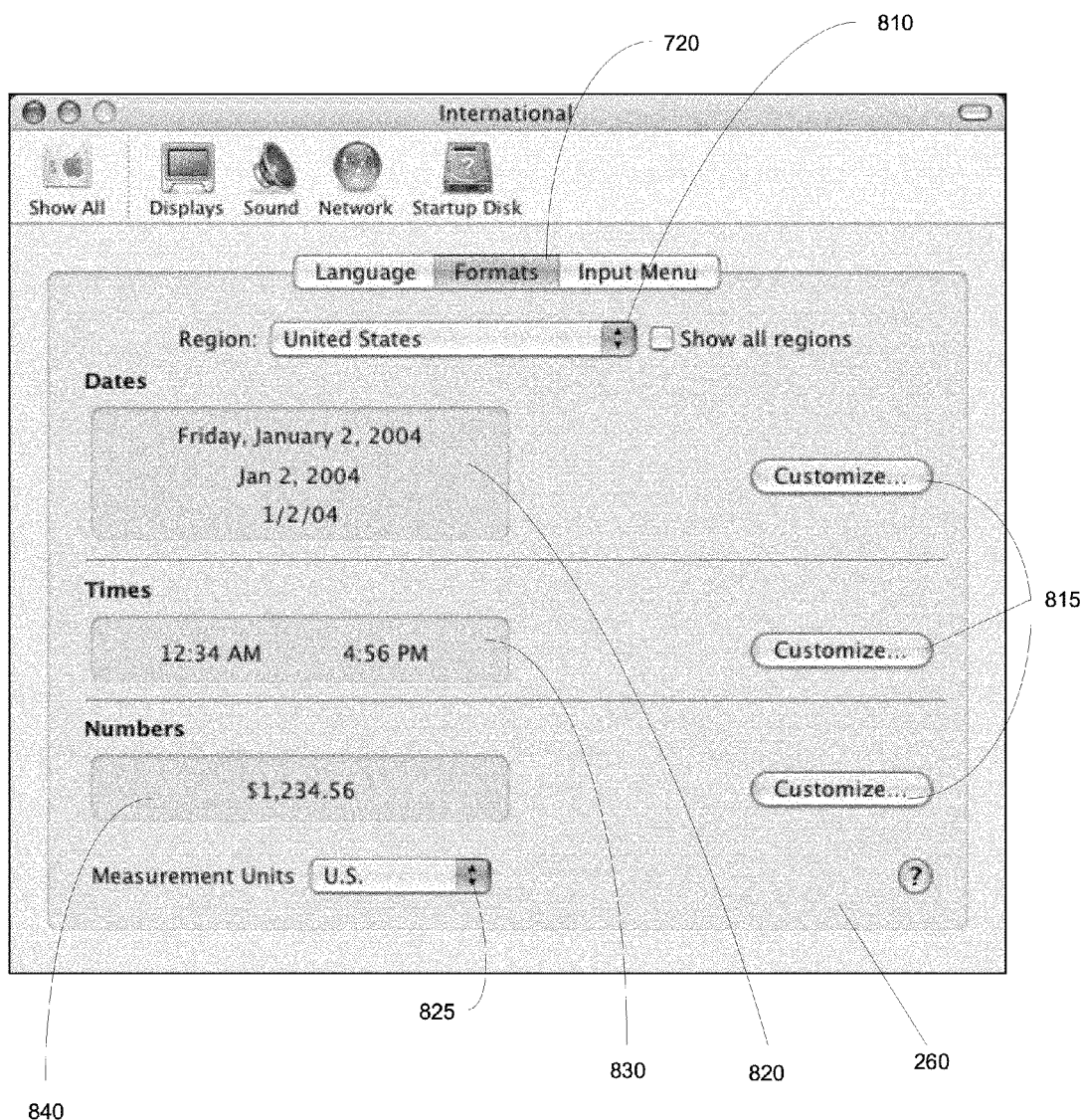
FIG. 8 illustrates a GUI tab panel with formats tab group selected.

FIG. 5 presents a process 500 that conceptually illustrates a series of operations for designing a window that uses different coloring schemes for a nested tab group. This process is described below by reference to examples that are illustrated in FIGS. 6, 7, and 8.

Figure 6:
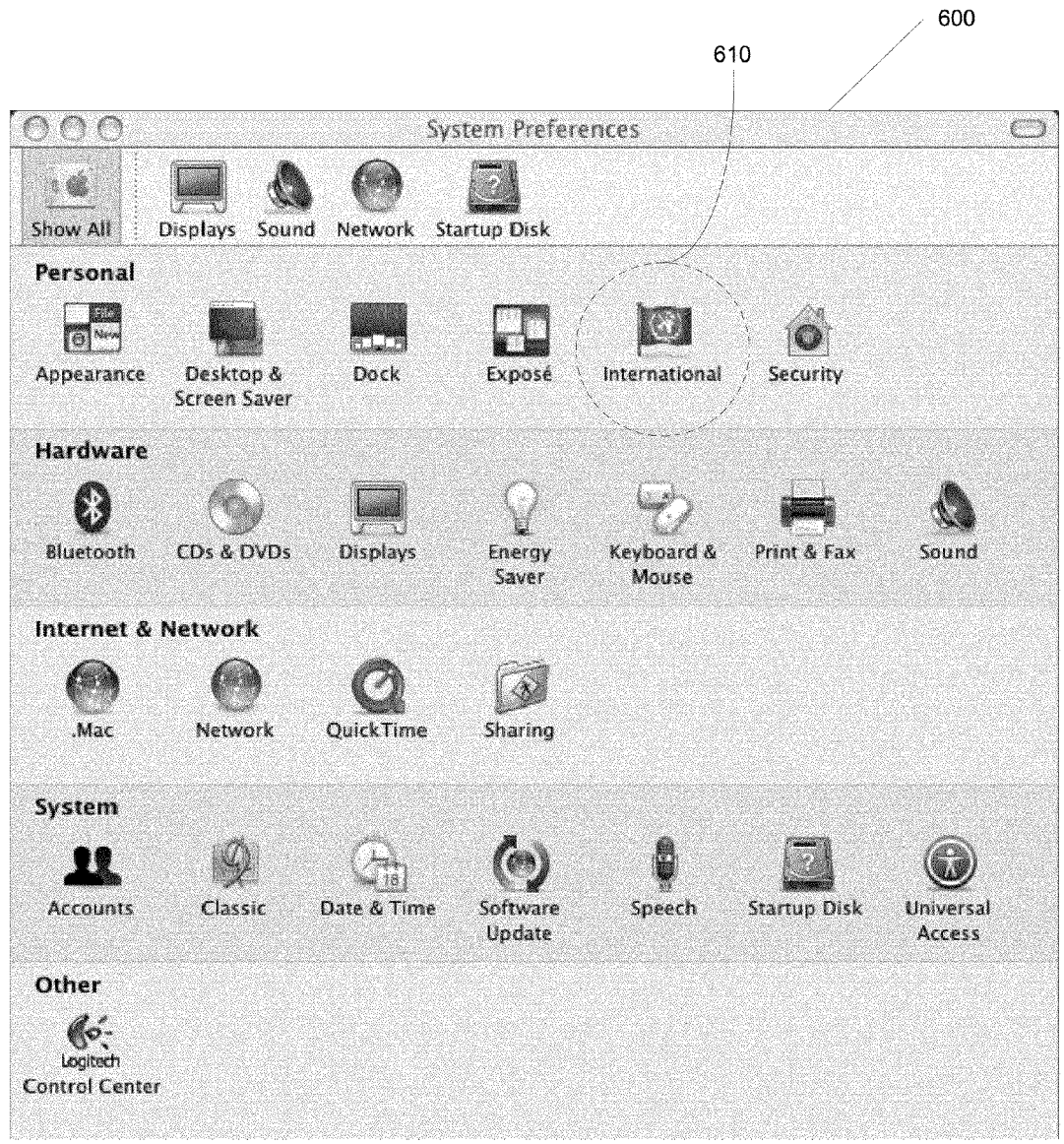
FIG. 6 illustrates a GUI tab panel with system preferences selected.

FIG. 6 illustrates a window 600 that contains an International icon 610. When this icon 610 is selected, the window 600 presents a tab group 700 and a display section 260, as illustrated in FIG. 7. The tab group 700 includes three tabs, which are the following three parent objects: Language 710, Format 720, and Input Menu 730. The display section 260 is for displaying the child objects of the parent tab group 700, as further described below.

According to the invention, the display section 260 has a different color shading than the region 250, which surrounds section 260 in the window 600. This different shading is to indicate that the display section 260 is displaying contents of the tab group. In other words, the different shading indicates that the display section is displaying objects at a lower level of a hierarchy than the objects associated with the region 250 of the window. In this case, the objects associated with the region 250 are the tab icons 710, 720, and 730 in the tab group 700, while the objects associated with the display section 260 are the child objects of the tab icons 710, 720, and 730.

As shown in FIG. 5, the process 500 starts by identifying (at 510) a window and a background color for the window. For instance, in the example illustrated in FIGS. 6-8, the process identifies the window 600 and the background color of the region 250 at 510. Next, the process identifies (at 520) a set of selectable parent objects and organizes them as a tab group. For example, in the example illustrated in FIGS. 6-8, the process identifies the Language, Format, and Input Menu icons 710, 720, and 730, and organizes them as a tab group 700.

The process then defines (at 530) a display section within the window 600 identified at 510. At 530, the process also assigns a color to this display section. This color is different than the color identified for the window 600 at 510. For instance, at 530, the process 500 defines the display section 260 in the example illustrated in FIG. 7.

As shown in this figure, the color of the display section 260 is different (i.e., in this case, has a different shade) than the color of the window 600's background region 250 that surrounds the section 260. As described above, this difference in color indicates that the objects that are displayed in the section 260 are at a lower level of the hierarchy than the objects that are displayed in the section 250, which in this case are the tab group icons 710-730. In the example presented in FIG. 7, the objects that are displayed in the section 250 are child objects of the Language icon 710. These child objects include a list display section 740, an Edit icon 750, and a sorting icon 760, as shown in FIG. 7. Once the grandchild objects have been identified, the process moves to 560.

Next, the process 500 chooses (at 540) one of the parent objects in the tab group. At 550, the process then defines all possible objects that are subordinate to the chosen parent object (i.e., this object's child objects, grandchild objects, etc.) and defines the layout display of these subordinate objects in the display section defined at 530. As mentioned above, FIG. 7 illustrates the display layout of the child objects of the Language icon 710 in the tab group 700.

When the selected parent object has multiple levels of child objects (i.e., has child objects, grandchild objects, etc.), the process 500 might define (at 550) smaller sub-sections of the display section for displaying some of the lower level child objects (e.g., the selected parent object's grandchild objects, great-grandchild objects, etc.).

FIG. 8 illustrates an example of illustrating more than two levels of hierarchy in more than two levels of display sections. Specifically, in display section 260 of the window 600, this figure illustrates the child objects of the Formats icon 720 of the tab group 700. These child objects include a Region icon 810, Customize icons 815, Date, Time, Numbers fields 820, 830, 840, and Measurement Units icon 825. These child icons are displayed in display section 260 to indicate a subordinate relationship between them and Format icon 720. The values of the Dates, Times, and Numbers fields 820, 830, and 840 are subordinate to the region specified by the Region icon 810. The values in these fields can also be changed through the operation of the Customize icons 815. As these values are sub-ordinate to these icons, the fields 820, 830, and 840 are defined within the display section 260 and have a different shading than this display section to indicate that they are objects at a lower level of the hierarchy than the Region and Customize icons 810 and 815. However, as the Date section 820, Time the section 830 and the Numbers section 840 are in the same hierarchical level, they have the same color.

After 550, the process 500 determines (at 560) whether it has examined the last parent object identified at 520. If not, the process returns to 540 to select another parent object, and then at 550 defines the display layout for objects that are subordinate to this parent object in the object hierarchy. When the process 500 determines (at 560) that it has examined the last parent object, the process terminates.

III. HIERCHICAL STRUCTURES WITHIN THE SAME WINDOW

The above process describes some embodiments where the hierarchical structure is located within a single window of a GUI. However, in some embodiments, the hierarchical structure is in multiple windows.

A. Hierarchical Objects that Open in Different Windows

Figure 9:
FIG. 9 illustrates a list-view of five nested folders.
Figure 10:
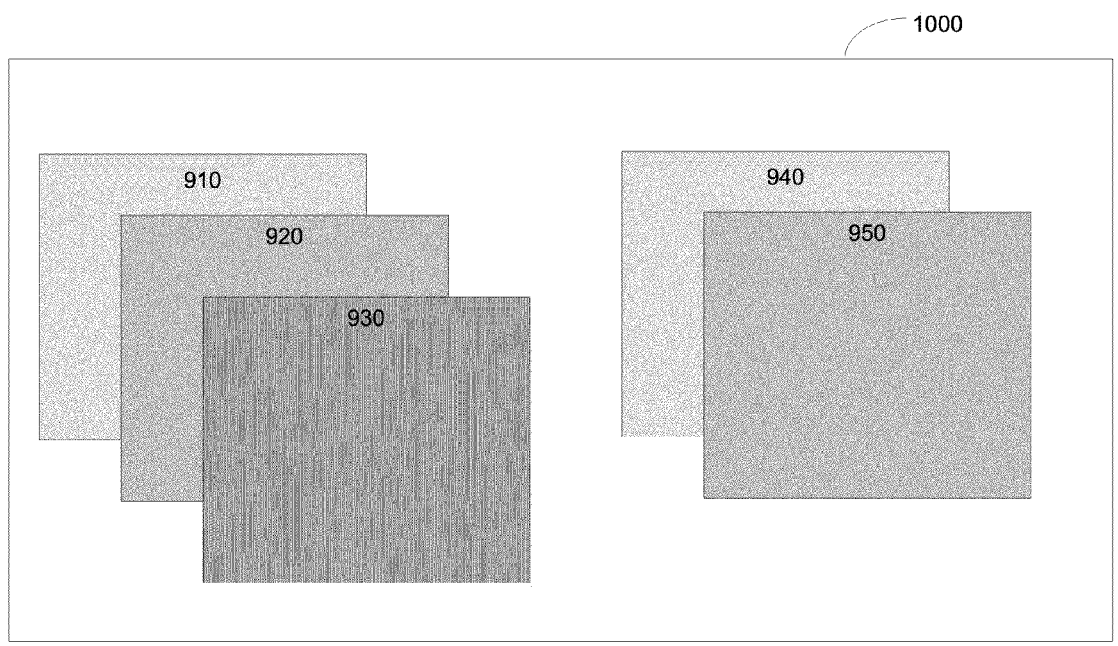
FIG. 10 illustrates a block diagram of five windows open for five folders.

Some embodiments use different colors (e.g., different shades of colors) for windows of objects at different levels of a hierarchical structure, in order to visually convey the ranking of the objects in the hierarchy. FIGS. 9 and 10 illustrate one example of this approach.

Specifically, FIG. 9 illustrates a window 900 that provides a list-view illustration of five nested folders. This figure illustrates that a parent folder 910 contains (i.e., has) a child folder 920, which, in turn, contains a folder 930. It also illustrates a parent folder 940 that contains a child folder 950. The parent folders 910 and 940 are at the same level of a hierarchy (i.e., they are both parent folders in window 900). Similarly, the folders 920 and 950 are at the same level of the hierarchy (i.e., they are child folders of two folders 910 and 940 at the same level of the hierarchy).

FIG. 10 illustrates a GUI 1000 that has five windows open for the five folders 910-950. According to some embodiments of the invention, this GUI uses colors to distinguish windows of folders that are at different levels of the hierarchy. For instance, it uses three different shades of grey to represent the three folders 910, 920, and 930 that have a parent, child, and/or grandchild relationships with each other. Also, according to some embodiments of the invention, the GUI 1000 uses the same shade of grey to color windows at the same level of the hierarchy. Specifically, it uses the same color to represent parent folders 910 and 940, and the same color to represent child folders 920 and 950.

Figure 11:
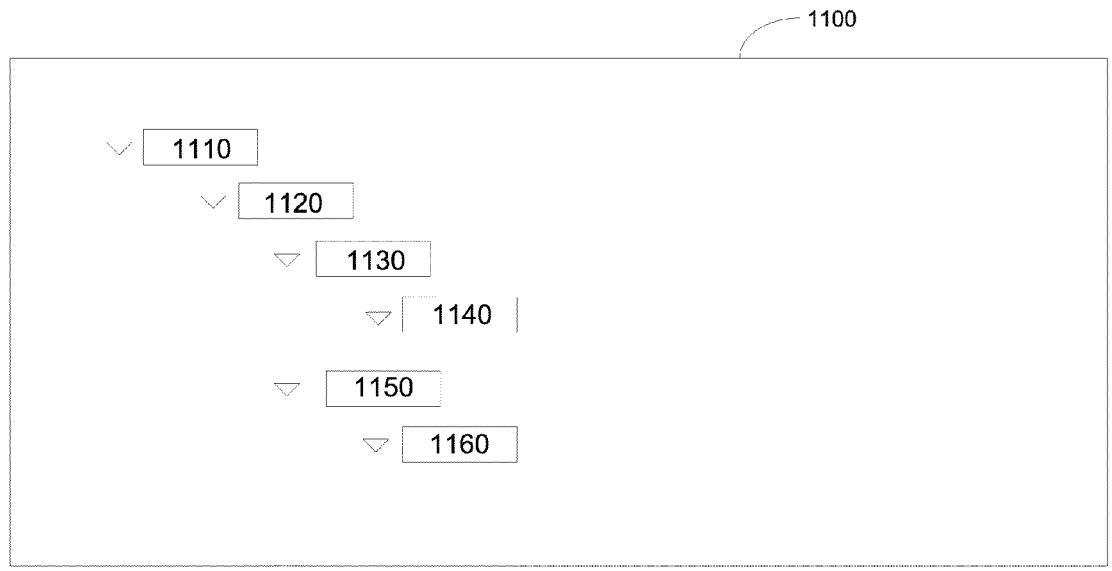
FIG. 11 illustrates a list-view of six nested folders.
Figure 12:
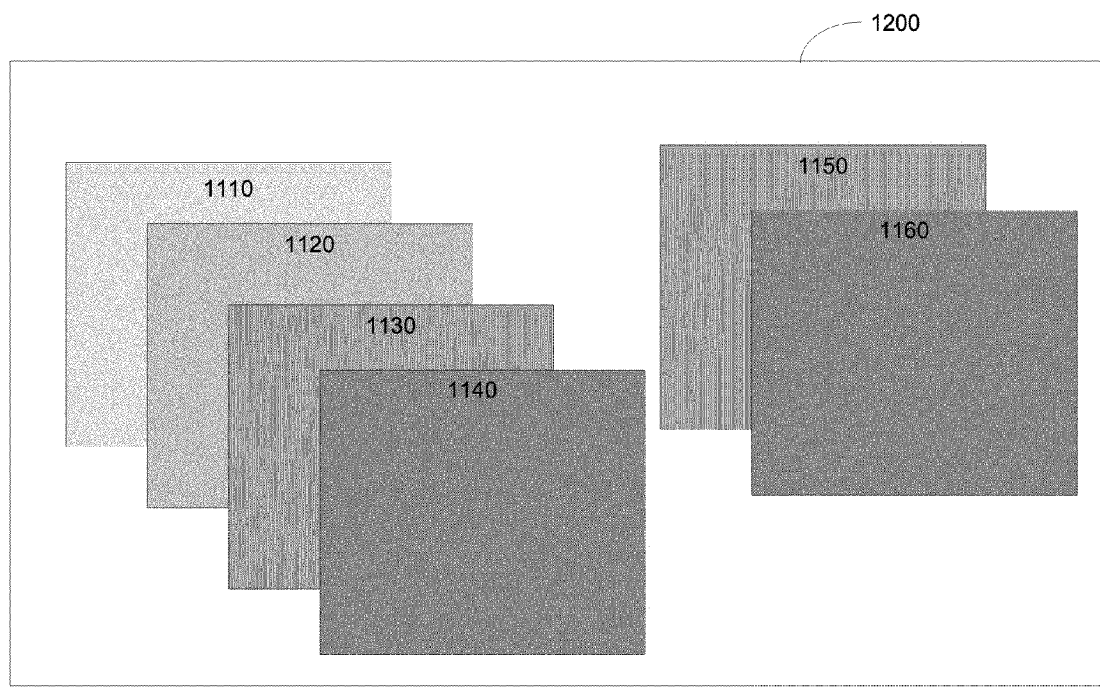
FIG. 12 illustrates a block diagram of six windows open for six folders.

FIGS. 11 and 12 illustrate another example using different colors (e.g., different shades of colors) for windows of objects at different levels of a hierarchical structure. Specifically, FIG. 11 illustrates a window 1100 that provides a list-view illustration of six nested folders. This figure illustrates that a parent folder 1110 contains a child folder 1120, which, in turn, contains two child folders 1130 and 1150 of its own. The folder 1130 has a child folder 1140, and the folder 1150 has a child folder 1160. In this example, the folders 1130 and 1150 are at the same level of the hierarchy within the window 1100 and the folders 1140 and 1160 are at the same level of the hierarchy within this window.

FIG. 12 illustrates a GUI 1200 that has six windows open for the six folders 1110-1160. According to some embodiments of the invention, this GUI uses colors to distinguish windows of folders that are at different levels of the hierarchy. For instance, it uses four different shades of grey to represent the four folders 1110, 1120, 1130, and 1140 that have a parent, child, grandchild, and/or great-grandchild relationships with each other. Also, according to some embodiments of the invention, the GUI 1100 uses the same shade of grey to color windows at the same level of the hierarchy. Specifically, it uses the same color to represent folders 1130 and 1150, and the same color to represent child folders 1150 and 1160.

B. Hierarchical Color Based on Positions of a Window

In some embodiments, the hierarchical structure is not based on a parent-child hierarchal relationship between objects in the GUI. For instance, some embodiments dynamically define hierarchical structures in real-time based only on a real-time layering of windows. These embodiments then assign colors to the windows based on this hierarchical structure. For example, the GUI objects can be windows organized in a stack, and the hierarchy between these objects is a stacking order of the windows in the stack.

Figure 13:
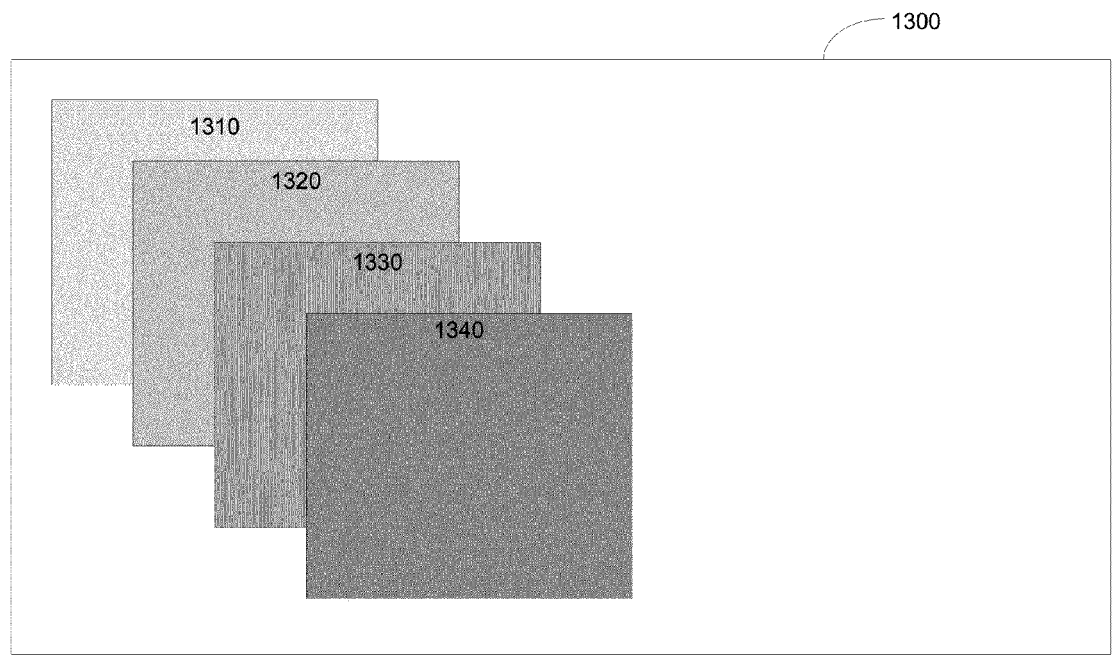
FIG. 13 illustrates four windows that are layered on top of each other.

FIGS. 13-16 illustrate one such embodiment. Specifically, FIG. 13 illustrates a GUI 1300 that includes four windows 1310, 1320, 1330, and 1340 that are layered one on top of the other. The window 1320 is stacked on top of the window 1310. The window 1330 is in turn stacked on top of the window 1320, while the window 1340 is stacked on top of the window 1330.

As shown in FIG. 13, the GUI uses different colors (e.g., different shades of color) for the windows that are stacked on top of each other. Specifically, in the example illustrated in FIG. 13, the windows progressively get darker as they stack on top of each other, with the bottom window 1310 (i.e., the window that sits at the bottom of the stack) having the lightest color, and the top window 1340 (i.e., the window that sits at the top of the stack) having the darkest color.

Figure 14:
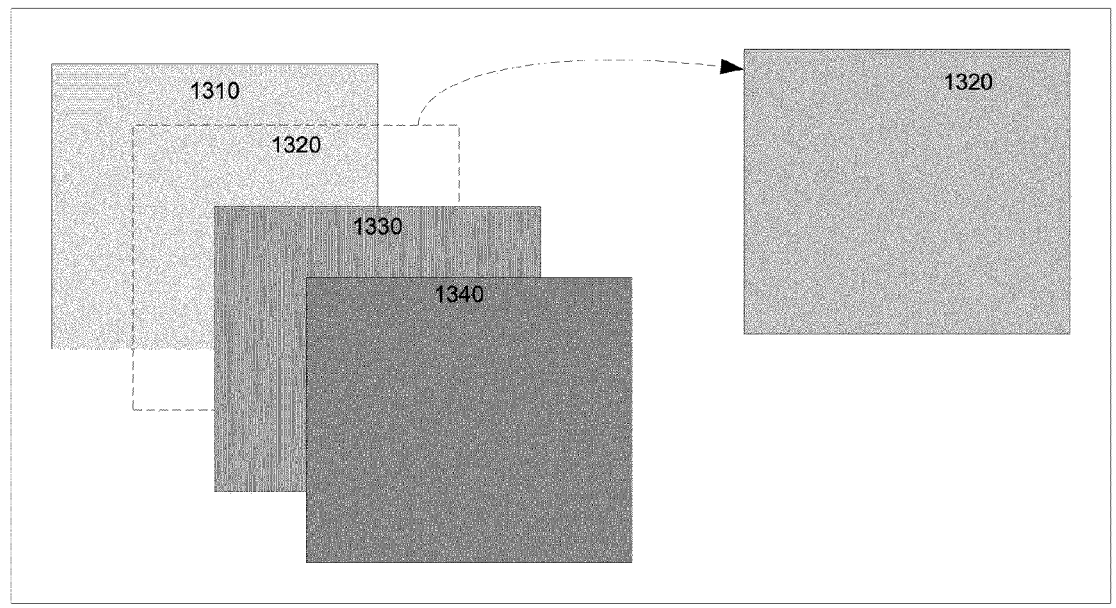
FIG. 14 illustrates a removal of a window from four windows that are layered on top of each other.
Figure 15:
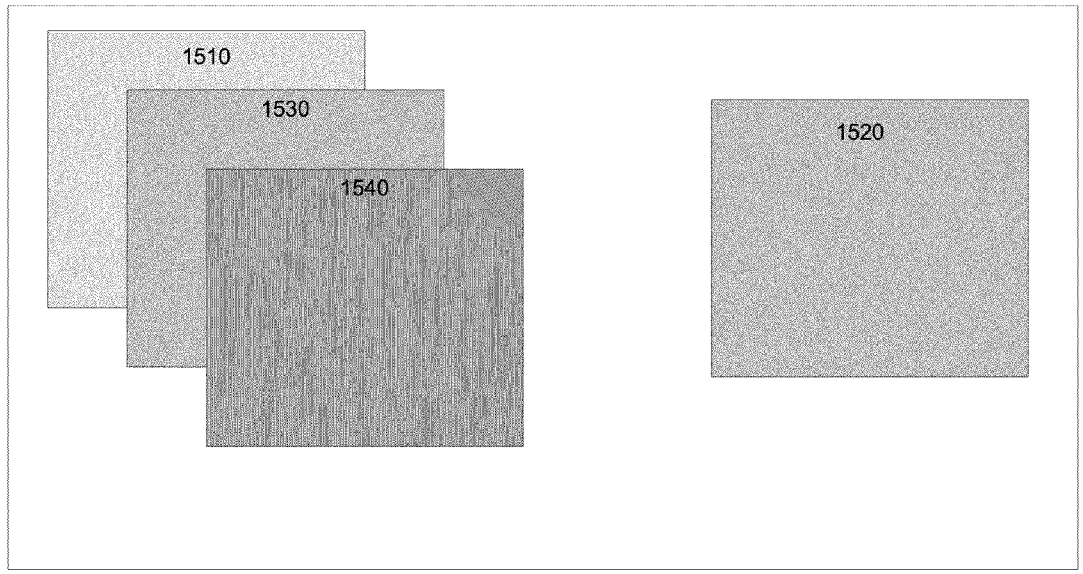
FIG. 15 illustrates three windows that are layered on top of each other and one window removed from the layered stack of windows.
Figure 16:
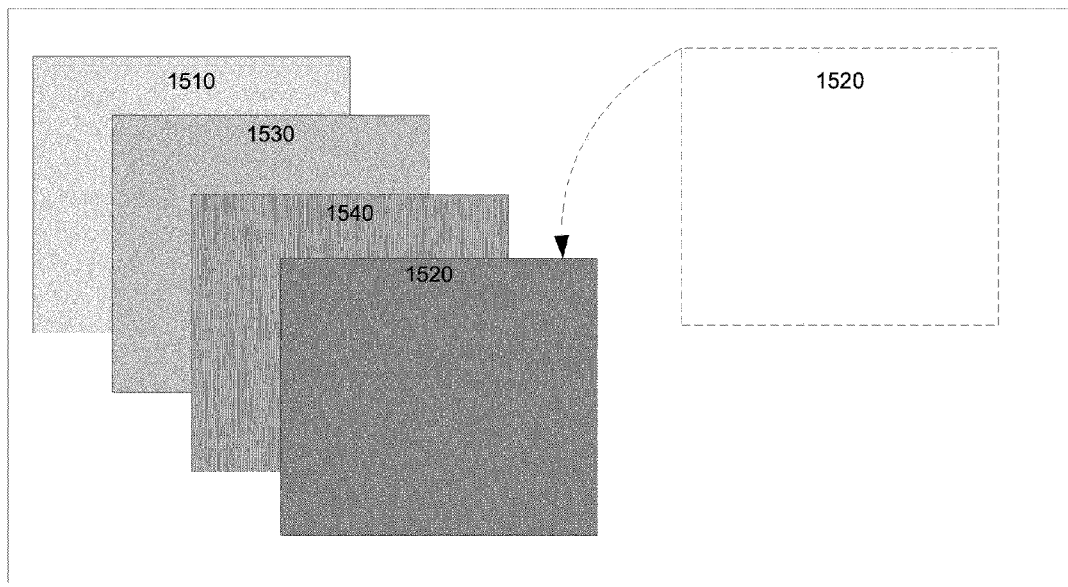
FIG. 16 illustrates a window being inserted into three windows that are layered on top of each other.

FIGS. 14-16 illustrate that some embodiments change the windows colors when one of the windows is removed from the stack or is inserted into the stack. Specifically, FIGS. 14 and 15 illustrate that the removal of the window 1320 from the stack, changes the color of the windows 1330 and 1340 in some embodiments. FIG. 16 illustrates that the insertion of the window 1320 on top of the stack then changes the color of this window. Before being placed on top of the stack, the window 1320 does not have a color that shows its position in the hierarchy in some embodiments, while it retains its color before its removal from the stack in other embodiments. In yet other embodiments, this window might be assigned a color that indicates its removal from the stack or indicates another attribute of this window.

V. COMPUTER SYSTEM

Figure 17:
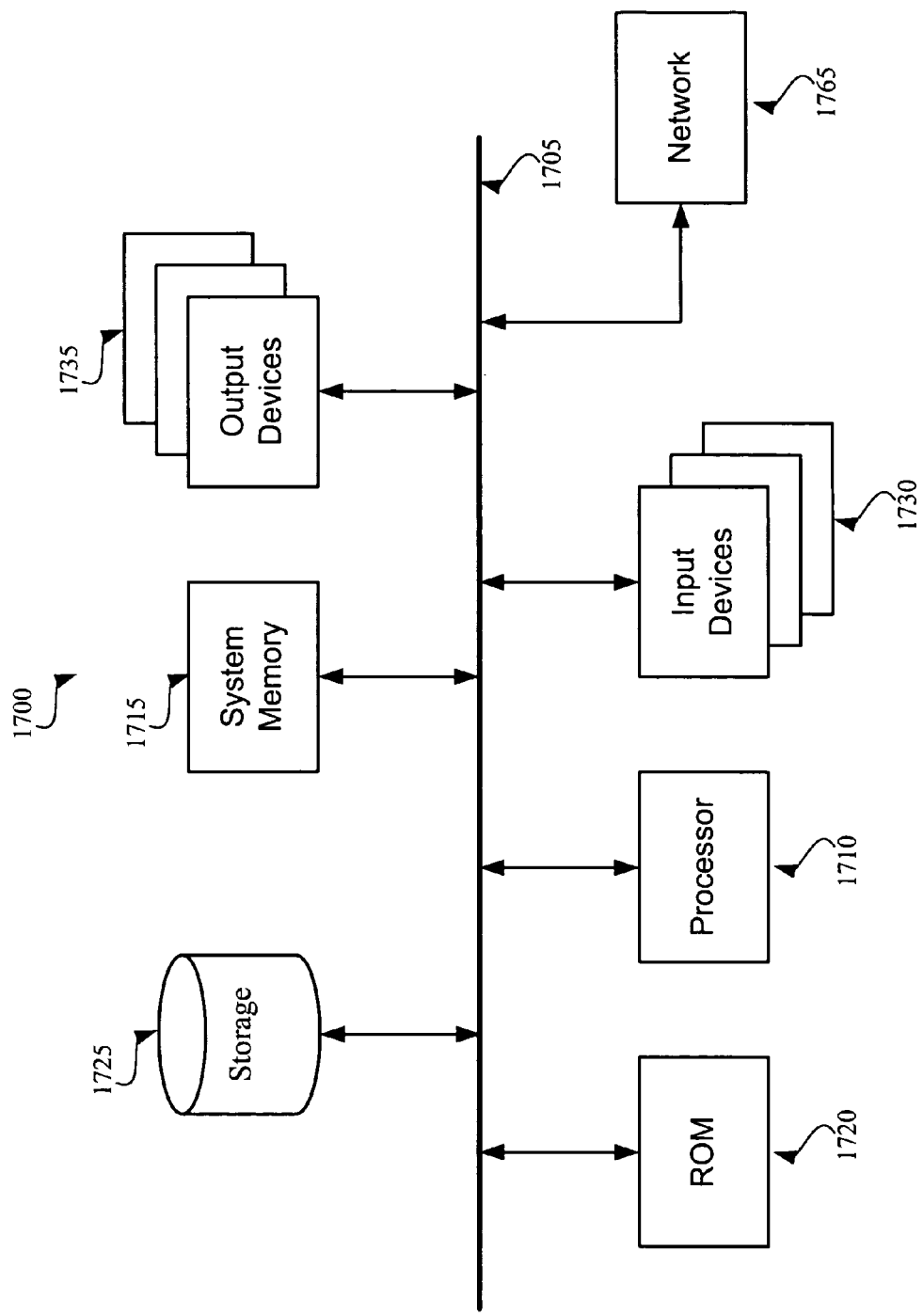
FIG. 17 illustrates a block diagram of a computer system.

FIG. 17 presents a computer system with which one embodiment of the invention is implemented. Computer system 1700 includes a bus 1705, a processor 1710, a system memory 1715, a read-only memory 1720, a permanent storage device 1725, input devices 1730, and output devices 1735. The bus 1705 collectively represents all system, peripheral, and chipset buses that communicatively connect the numerous internal devices of the computer system 1700. For instance, the bus 1705 communicatively connects the processor 1710 with the read-only memory 1720, the system memory 1715, and the permanent storage device 1725.

From these various memory units, the processor 1710 retrieves instructions to execute and data to process in order to execute the processes of the invention. The read-only-memory (ROM) 1720 stores static data and instructions that are needed by the processor 1710 and other modules of the computer system.

The permanent storage device 1725, on the other hand, is read-and-write memory device. This device is a non-volatile memory unit that stores instruction and data even when the computer system 1700 is off. Some embodiments of the invention use a mass-storage device (such as a magnetic or optical disk and its corresponding disk drive) as the permanent storage device 1725.

Other embodiments use a removable storage device (such as a floppy disk or zip® disk, and its corresponding disk drive) as the permanent storage device. Like the permanent storage device 1725, the system memory 1715 is a read-and-write memory device. However, unlike storage device 1725, the system memory is a volatile read-and-write memory, such as a random access memory. The system memory stores some of the instructions and data that the processor needs at runtime. In some embodiments, the invention's processes are stored in the system memory 1715, the permanent storage device 1725, and/or the read-only memory 1720.

The bus 1705 also connects to the input and output devices 1730 and 1735. The input devices enable the user to communicate information and select commands to the computer system. The input devices 1730 include alphanumeric keyboards and cursor-controllers. The output devices 1735 display images generated by the computer system. For instance, these devices display IC design layouts. The output devices include printers and display devices, such as cathode ray tubes (CRT) or liquid crystal displays (LCD).

Finally, as shown in FIG. 17, bus 1705 also couples computer 1700 to a network 1765 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1700 may be used in conjunction with the invention. However, one of ordinary skill in the art would appreciate that any other system configuration may also be used in conjunction with the present invention.

The above-described embodiments have numerous advantages. For instances, by indicating hierarchy between objects in a GUI through the use of colors, these embodiments enable users of computers to be able to better see the hierarchical structure of objects in GUI. In the past, users had to rely on text description of the objects to determine the objects hierarchy level within the graphical user interface. Now, when an object has a different color (e.g., a darker color) than another object, users can immediately ascertain the hierarchical relationship between the objects.

While the invention has been described with reference to numerous specific details, one of ordinary skill in the art will recognize that the invention can be embodied in other specific forms without departing from the spirit of the invention. For example, in some embodiments, progressively darker colors are used to indicate hierarchy. In some embodiments, progressively lighter colors are used to indicate hierarchy. Thus, one of ordinary skill in the art would understand that the invention is not to be limited by the foregoing illustrative details, but rather is to be defined by the appended claims.

What is claimed is:

1. For a graphical user interface (GUI) of a computer system, a method comprising:
    displaying a plurality of parent selectable items comprising a first parent selectable item and a second parent selectable item, wherein the first parent selectable item provides access to a first set of child selectable items, wherein the second parent selectable item provides access to a second set of child selectable items;
    displaying a first display area for displaying the plurality of parent selectable items, the first display area displayed by using a first color;
    displaying the first set of child selectable items in a second display area when the first parent selectable item is selected; and
    displaying the second set of child selectable items in the second display area when the second parent selectable item is selected, the second display area having a fixed display that remains unchanged regardless of which parent selectable item is selected,
    wherein only one of the first and second sets of child selectable items may be displayed at a time in the second display area, the second display area displayed by using a second color that is different than the first color to color at least a portion of the second display area to convey a hierarchical relationship between the selected parent selectable item and the set of child selectable items displayed in the second display area.

2. The method of claim 1, wherein the first and second parent selectable items are tabs associated with a particular icon from an icon group, the particular icon being a parent of the first and second parent selectable items.

3. The method of claim 2, wherein the first and second parent selectable items are linearly arranged in the first display area and the particular icon is linearly arranged with other icons in the icon group in a third display area that is displayed by using a third color different from the first and second colors.

4. The method of claim 1, wherein the first and second display areas are both displayed within a window.

5. The method of claim 1, wherein the first set of child selectable items comprises more than one child selectable item and the second set of child selectable items comprises only one child selectable item.

6. The method of claim 1, wherein the fixed display of the second display area comprises a fixed size and shape.

7. A non-transitory computer readable medium storing a computer program executable by at least one processor, the computer program for providing a graphical user interface ("GUI"), the computer program comprising sets of instructions for:
    providing a plurality of parent selectable items comprising a first parent selectable item and a second parent selectable item, wherein the first parent selectable item provides access to a first set of child selectable items, wherein the second parent selectable item provides access to a second set of child selectable items;
    providing a first display area for displaying the plurality of parent selectable items, the first display area being provided by using a first color; and
    providing a second display area for (i) displaying the first set of child selectable items when the first parent selectable item is selected and (ii) displaying the second set of child selectable items when the second parent selectable item is selected, wherein only one set of child selectable items may be displayed at a time in the second display area, the second display area being provided by using a second color that is different than the first color to color at least a portion of the second display area to highlight a parent-child relationship between the selected parent item and the set of child selectable items displayed in the second display area, the first and second display areas each having a fixed size that does not change regardless of which parent selectable item is selected.

8. The non-transitory computer readable medium of claim 7, wherein the plurality of parent selectable items defines a tab group and each parent selectable item from the plurality of parent selectable items is a particular tab.

9. The non-transitory computer readable medium of claim 8, wherein the plurality of parent selectable items are provided in a horizontal arrangement.

* * * * *